(12) United States Patent
Koohestanian

(10) Patent No.: US 9,389,773 B2
(45) Date of Patent: Jul. 12, 2016

(54) CLOUD OS AND VIRTUALIZED BROWSER WITH USER PRESENCE MANAGEMENT

(71) Applicant: re2you Inc., Seattle, WA (US)

(72) Inventor: Ghazaleh Koohestanian, Berlin (DE)

(73) Assignee: re2you, Inc., Seattle, WA (US)

( * ) Notice: Subject to any disclaimer, the term of this patent is extended or adjusted under 35 U.S.C. 154(b) by 0 days.

(21) Appl. No.: 14/326,219

(22) Filed: Jul. 8, 2014

(65) Prior Publication Data

US 2015/0253963 A1  Sep. 10, 2015

Related U.S. Application Data

(60) Provisional application No. 61/948,782, filed on Mar. 6, 2014.

(51) Int. Cl.
| | |
|---|---|
| *G06F 3/00* | (2006.01) |
| *G06F 3/048* | (2013.01) |
| *G06F 3/0486* | (2013.01) |
| *G06Q 50/00* | (2012.01) |
| *G06F 17/30* | (2006.01) |

(52) U.S. Cl.
CPC ........ *G06F 3/0486* (2013.01); *G06F 17/30899* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,521,857 B2* | 8/2013 | Maxwell | ................ | G06F 3/147 709/203 |
| 8,549,419 B2* | 10/2013 | Park | ..................... | G06F 3/0481 345/173 |
| 8,769,110 B2* | 7/2014 | Amendolagine | ........ | G09G 5/00 345/156 |
| 8,819,569 B2* | 8/2014 | SanGiovanni et al. | ........ | 715/767 |
| 2005/0049989 A1* | 3/2005 | Kaminsky | ................ | G06N 5/04 706/47 |
| 2005/0065913 A1* | 3/2005 | Lillie et al. | ........................ | 707/3 |
| 2006/0095976 A1* | 5/2006 | Torres et al. | .................... | 726/28 |
| 2006/0107231 A1* | 5/2006 | Matthews | ............. | G06F 3/0481 715/788 |

(Continued)

OTHER PUBLICATIONS

E. Blattberg, "Google's Chromecast Streamer Can Now Mirror Android Devices on Your TV," Jul. 9, 2014, http://venturebeat.com/2014/07/09/googles-chromecase, 7 pages.

*Primary Examiner* — Yongjia Pan

(57) ABSTRACT

In accordance with one aspect of the present invention, disclosed hereunder, is a web-browsed/cloud-based portal for users and businesses that allows them manage their full online presence. Users can organize and personalize their favorite websites, communities, and applications. The interface of the system is a live tile-based online platform. Hence, the user becomes the center of the Internet and no longer has to adapt to content.

18 Claims, 7 Drawing Sheets

(56) References Cited

U.S. PATENT DOCUMENTS

| | | | |
|---|---|---|---|
| 2006/0156228 A1* | 7/2006 | Gallo et al. | 715/523 |
| 2006/0161863 A1* | 7/2006 | Gallo | 715/810 |
| 2006/0230061 A1* | 10/2006 | Sample et al. | 707/103 R |
| 2006/0277469 A1* | 12/2006 | Chaudhri et al. | 715/709 |
| 2006/0277481 A1* | 12/2006 | Forstall et al. | 715/764 |
| 2007/0082707 A1* | 4/2007 | Flynt et al. | 455/564 |
| 2007/0101146 A1* | 5/2007 | Louch et al. | 713/176 |
| 2007/0101291 A1* | 5/2007 | Forstall et al. | 715/805 |
| 2007/0130541 A1* | 6/2007 | Louch | G06F 3/04817 715/804 |
| 2008/0141153 A1* | 6/2008 | Samson | G06F 3/0481 715/769 |
| 2008/0195961 A1* | 8/2008 | Bae | G06F 3/0481 715/769 |
| 2009/0249359 A1* | 10/2009 | Caunter | G06F 9/4448 719/315 |
| 2011/0113343 A1* | 5/2011 | Trauth | 715/738 |
| 2011/0197136 A1* | 8/2011 | Duke | G06F 17/3089 715/738 |
| 2012/0023200 A1* | 1/2012 | Johnson | G06F 9/542 709/219 |
| 2012/0030567 A1* | 2/2012 | Victor | G06F 3/0482 715/702 |
| 2012/0290908 A1* | 11/2012 | Kumar | 715/205 |
| 2013/0047104 A1* | 2/2013 | Chen | G06F 3/0481 715/765 |
| 2015/0095776 A1* | 4/2015 | Egan | H04L 43/045 715/716 |

* cited by examiner

CLOUD OS AND VIRTUALIZED BROWSER WITH USER PRESENCE MANAGEMENT

CROSS-REFERENCE TO RELATED APPLICATION(S)

This application is a U.S. non-provisional patent application that claims the benefit of U.S. provisional patent application No. 61/948,782, entitled "WEB-BROWSED CLOUD PORTAL WITH USER PRESENCE MANAGEMENT," filed on Mar. 6, 2014, which is incorporated by reference herein in its entirety.

TECHNICAL FIELD

At least one embodiment of the present invention relates to the field of facilitating cloud OS and virtualized browser with user presence management. In particular, the present invention relates to a web-browsed/cloud-based portal that enables users and businesses to manage their full online presence.

BACKGROUND

A web portal is most often a specially-designed Web page at a website which brings information together from diverse sources in a uniform way. Usually, each information source gets its dedicated area on the page for displaying information. Often, the user can configure which ones to display.

Cloud computing is computing that involves a large number of computers connected through a communication network such as the Internet, similar to utility computing. Network-based services, which appear to be provided by real server hardware and are in fact served up by virtual hardware simulated by software running on one or more real machines, are often called cloud computing.

However, present-day web portals lack effective methods to enable users and businesses to manage their full online presence. Users lack means to organize and personalize their favorite websites, communities, and applications. Furthermore, the present-day web portals lack effective methods to assimilate relevant information specific to an individual user.

SUMMARY

In accordance with one aspect of the present invention, disclosed hereunder, is a web-browsed/cloud-based portal for users and businesses that allows them manage their full online presence. Users can organize and personalize their favorite websites, communities, and applications. The interface of the system is a live tile-based online platform. Hence, the user becomes the center of the Internet and no longer has to adapt to content. Instead, the content will assimilate in accordance with the user's preferences and essentially acts like a magic mirror, cloning the user's websites in real time. Additionally, the user can interact with the tile-based online platform to make changes such as, e.g., drag and drop contents between sites (tiles) without ever touching the source code or downloading/uploading data or any content locally.

For example, a live tile-based platform based on cloud can be created for a user to fully manage the user's online presence. For instance, the user's favorite web channels are a Yahoo Finance website, the Google search webpage, a Facebook site, a YouTube channel and an Instagram site. The live tile-based platform contains tiles in which each tile clones and displays the contents of each web channel. The first tile can be the Yahoo Finance website, the second tile can be a Google search webpage, and so on. The order of the tiles can be set up based on predetermined user preferences. In addition, the user can manually adjust the organization of the tiles, the size of each tile, and the display aspects of the tiles.

In one embodiment, the user gains access to the content of the web channels by logging into the tile-based platform only once. The user can save a lot of time by being required to log in only once. The websites and the tile-based platform can establish a trust relationship. The tiles in the platform are updated in real time, and therefore, the user has a self-centered Internet experience.

In one embodiment, the user can configure the live tile-based platform by dragging and dropping the content of the first tile of the live tile-based platform to a second tile of the live tile-based platform without actually modifying any of the source code of the web channels.

In one embodiment, the platform analyzes the activity of the user across web channels where the user may browse any of the web channels, interact with other users in any of the web channels, or upload content to any of the web channels. Accordingly, the platform can filter information from other Internet sources based on analyzing the activity of the user, in which only relevant information is passed to the user. For example, if the user asks a question in the user's Facebook page about a trip planned abroad, the platform can pass the advertisement of an air ticket to the user and block the advertisement for home improvement.

In one embodiment, the platform can notify the user of a request from any web channel when the web channel wants to obtain a cookie from the user. The user can make a choice whether to allow the web channel to obtain the cookie.

In one embodiment, the platform enables the user to view one or more web channels continuously when the user switches from a first device to a second device. For example, the user is watching a video clip in YouTube within the tile-based platform on a smart phone that is nearly out of power. The user can log in to the platform on a laptop computer and continue watching the video clip from where the user left off on the smartphone. The process is very user-friendly and greatly enhances the user experience.

DETAILED DESCRIPTION

Figure 1:
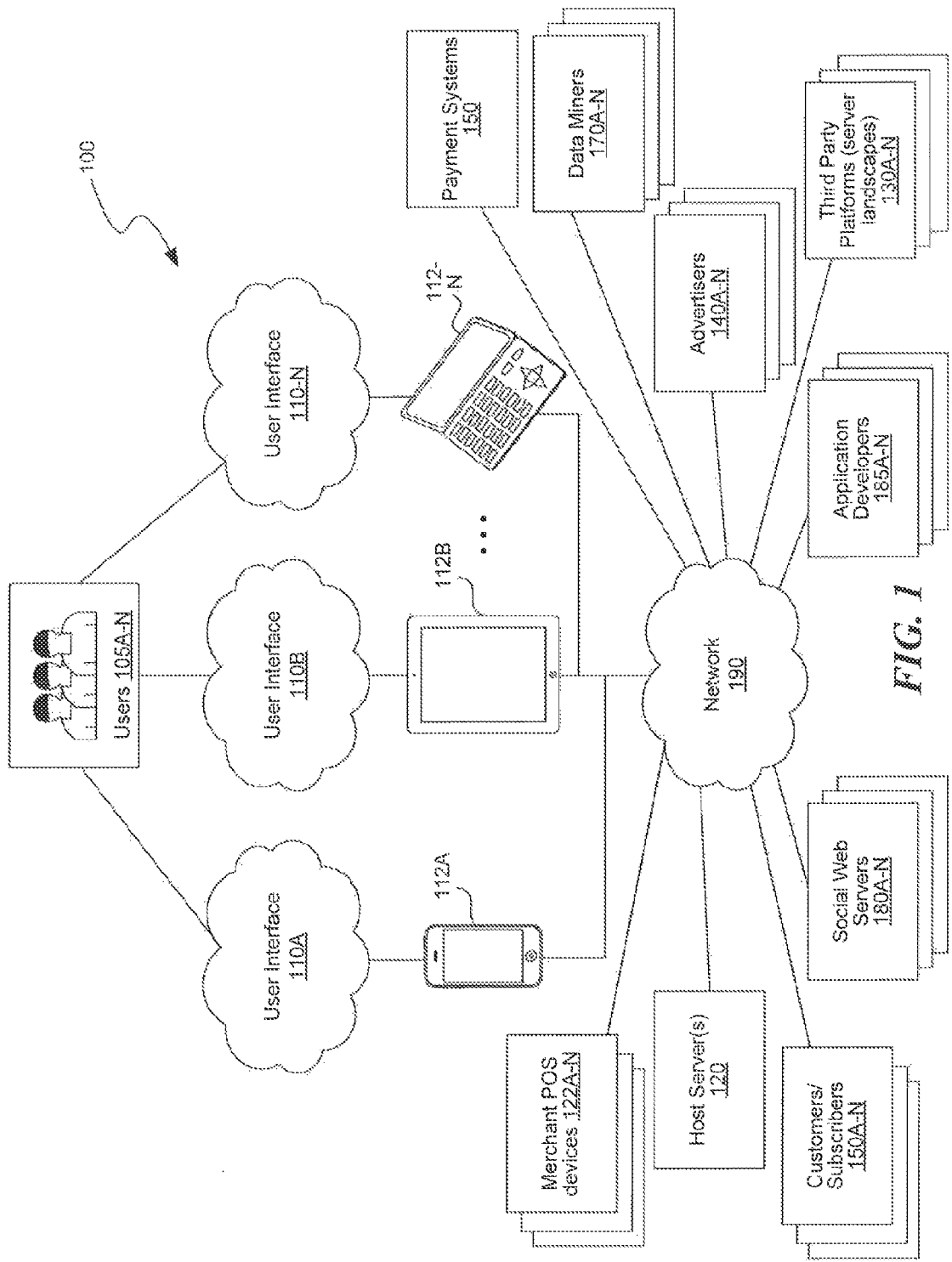
FIG. 1 depicts a block diagram of an example environment suitable for facilitating cloud-based web browsing with user presence management.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; such references mean at least one of the embodiments.

Reference in this specification to "one embodiment" or "an embodiment" means that a particular feature, structure, or characteristic described in connection with the embodiment is included in at least one embodiment of the disclosure. The appearance of the phrase "in one embodiment" in various places in the specification do not necessarily all refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted using, for example, italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatuses, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure include systems, methods, and machine-readable media for facilitating cloud-based web browsing with user presence management.

A web-browsed/cloud-based portal system and methods of use are provided. The system allows users (e.g., individual users and/or customers/subscribers or businesses, etc.) to manage their online presence. For example, users can organize and/or personalize their favorite channels (e.g., websites, communities, applications, etc.). A streaming video interface provides the users with a secure live tile-based online platform to which users only have to log on once. Additionally, the users can log on and off of the system with any number of devices without ending web-browsing sessions. In the web-browsed/cloud-based environment, the user becomes the center of the Internet and content assimilates to the user's preferences.

In one embodiment, the system acts like a magic mirror cloning a user's selected channels (e.g., websites) in real time in multiple tiles of a tile-based dashboard display. Advantageously, in the tile-based dashboard a user can make changes per drag and drop between sites (tiles) without ever touching the source code or downloading/uploading data or any content to a local device. For example, a dragged-and-dropped content item, e.g., a photo, can be dragged from a tile cloning the user's Facebook account to a tile cloning the user's Twitter account. This process can be accomplished without the need for the picture to be downloaded to the user's local client system (e.g., laptop computer or smart phone). Instead, the system provided herein downloads the picture from the user's Facebook account and uploads it to the user's Twitter account. Thus, with the system described herein, no uploads and downloads are required. Rather, the system allows users to simply drag and drop content from one provider to another.

In one embodiment, the system works at a meta layer above the existing services and thus implements a new network to connect all of the user's web pages. This allows the user to move data across the Internet and devices without depending on the network. That is, the user's actions take place behind a protective shield, ensuring privacy. Furthermore, a user can log on to her dashboard from a computer at home, log out, and log back in with her phone to start viewing her websites just as she left them. For example, a user can log in to her dashboard from her work computer, enlarge a tile displaying her Gmail account, and start an email to a friend. The user can then, without logging out of Gmail, log out of her dashboard and/or close down her work computer and then log back in to her dashboard with her mobile device to finish her email right where she left off.

In one embodiment, the system provides cloud- and web-browser operating system (OS) technology. Advantageously, no cache, no data mining, and no data exchange is required. Rather, if a session requests that a user drop a cookie and/or otherwise leave user data, the system can notify the user and ask them whether or not they want to leave the cookie.

In one embodiment, the system removes the need for users to upload and/or download items from one third party platform to another. Rather, the users can simply drag and drop content/data from one third-party platform to another.

In one embodiment, the system described herein provides a web-browsed/cloud-based portal for users, which can manage their full online presence. In other words, the user becomes the center of the user's personal Internet. The tile-based interface is a live (dynamic and real time) tile-based online platform which requires that the user log in only once. The user no longer has to adapt to the content; the content will assimilate to the user's preferences. As discussed, the system is like a magic mirror (as layer) and clones the content in real time. In this mirror image a user can make changes per drag-and-drop without even touching the source codes or downloading and uploading data.

In one embodiment, the system filters users' everyday web experiences and makes the user more efficient, helps to learn and identify additional possibilities of the Internet, and empowers the user to be the center of the World Wide Web. Additionally, the system can make more directed advertisements and thereby marketers (e.g., advertisers) can save money and lessen the user's annoyance with online ads by making sure the ads are in fact relevant. The system can make ads more relevant because it can access information about a user's activity across all third-party platforms. Furthermore, smart recommendation engines are used so that a user is not, for example, offered a rental car for a trip in which the user is clearly going on a hiking/camping trip.

In one embodiment, the system connects multiple websites and apps into one tile-based interface. Users get live views of their favorite sites, which are shown in a single browser tab or a single app for mobile devices. The tiles, views, etc. of the dashboard are configurable. By changing the order and size of the views and/or by adding new services, the user can create a personal web experience.

In one embodiment, the system essentially acts as an inter-cloud layer on top of the Internet. E-commerce and SME sites looking for an alternative are potential customers, because Internet and mobile advertisements are broken. The system helps the users to (re)own their web experience and maintain their privacy while enabling marketers to make more relevant offerings. The system creates a co-ownership of web usage with the user and utilizes the insights obtained as a result of user activity across various platforms as input for determining these more relevant offerings.

In one embodiment, the system functions as a 'cocoon' that facilitates the user's interactions on the Internet. A cloud-based browser, it allows the user to customize their experience across all devices, social networks, favorite websites and clouds. The system allows the user to adapt the Internet to the user's specifications and/or aggregate the user's digital life. Because the system is cloud-based, it allows users to begin surfing the Internet on a smartphone, and then switch to a tablet or computer browser without needing to reload the session(s). The system allows users to seamlessly pick up from where they left off, because it gathers input in real time. The system makes transferring information seamless and fast: users no longer need to cut or copy and paste words and images. They can simply drag and drop between any websites in the system's smooth, customizable interface.

In one embodiment, the cocoon protects the user's information. Because it functions like a mirror, it is harder for attackers to access passwords and personal data. A single server allows hackers a direct line to the user's personal information; not so with re2you's mirroring function, which poses challenges for hackers and people seeking to access that data.

In one embodiment, the insights a user provides to the system (or through the system) in the process of, for example, web surfing, allows the user to customize and streamline digital aspects of the user's home life, as well as enabling interactions with his home devices, like the refrigerator, sound system, and television. Re2you will know how the user's day was, how much data and what data content has been moving around; it will have insight into the stress level of the user's day, and it will be able to adapt all of the home devices to the user's mood—without data mining or compromising privacy.

In one embodiment, the system allows the users to experience the Internet without limits. That is, the user becomes the center of the network, not just a spectator or data producer. The system makes the Internet work for the user as a responsive system, enabled by the user, using the untapped potential of the common web in direct reaction to the user. The system works at a meta layer above the existing services by implementing a new network to connect all the web pages through the user, which allows the user to move data across the Internet and devices without depending on the network. The user's actions thus take place behind a protective shield, ensuring privacy. Today, users are generally seen as a data supplier. Most users are unaware of how much information is imparted to supposedly free services. The system notifies users when a system requests information and allows users to determine whether or not they want to impart such information (i.e., users can manage their presence).

FIG. 1 depicts a block diagram of environment 100 suitable for facilitating cloud-based web browsing. Environment 100 includes multiple client devices 112A-N, a host server 120, multiple third party platforms 130A-N, multiple advertisers 140A-N, multiple customers/subscribers 150A-N, multiple merchant POS devices 122A-N, multiple social Web servers 180A-N, multiple application developers 185A-N, multiple data miners 170A-N, payment systems 150 and network 190.

Host server 120 is configured to communicate with client devices 112A-N, third-party platforms 130A-N, advertisers 140A-N, and customers/subscribers 150A-N in order to facilitate cloud-based web browsing with user presence management.

In some embodiments, the host server 120 facilitates cloud-based web browsing with user presence management as described herein. An example host server (system) is described in greater detail with reference to FIG. 2.

The multiple client devices 112A-N can be any systems, devices, and/or any combination of devices/systems that are able to establish a connection with another device, server and/or other system. The client devices 112A-N typically include respective user interfaces 110A-N. The user interfaces 110A-N include one or more input devices and a display or other output functionalities to present data exchanged between the devices to a user. For example, the client devices can include, but are not limited to, a server desktop, a desktop computer, a computer cluster, a mobile computing device such as a notebook, a laptop computer, a handheld computer, a mobile phone, a smart phone, a PDA, a BlackBerry™ device, a Treo™, and/or an iPhone™ or Droid device, etc. In some embodiments, the client devices 112A-N are coupled to network 190.

In some embodiments, mobile devices of the client devices 112A-N can be configured to interact with the host server 120. For example, a mobile client device 112A can download an application ("app") that provides the client with the communication and functionality described herein. The application can provide the client with direct access to the host server for cloud-based web browsing with user presence management via the mobile device.

The network 190, to which the client devices 112A, 112B and 112-N and merchant POS devices 122A-N are coupled, can be a telephonic network, an open network, such as the Internet, or a private network, such as an intranet and/or the extranet. For example, the Internet can provide file transfer, remote login, email, news, RSS, and other services through any known or convenient protocol, such as, but not limited to the TCP/IP protocol, Open System Interconnections (OSI), FTP, UPnP, iSCSI, NSF. ISDN, PDH, RS-232, SDH, SONET, etc.

The network 190 can be any collection of distinct networks operating wholly or partially in conjunction to provide connectivity to the client devices 112A-N, merchant POS devices 122A-N, merchant web servers 130A-N, customer subscribers 150A-N payment systems 150, advertisers 140A-N, data miners 170A-N, social web servers 180A-N, and application developers 185A-N. In one embodiment, communications to and from the client devices 112A-N and to and from the merchant POS devices 122A-N can be achieved by an open network, such as the Internet, or a private network, such as an intranet and/or the extranet.

The client devices 112A-N can be coupled to the network (e.g., Internet) via a dial-up connection, a digital subscriber loop (DSL, ADSL), cable modem, wireless connections, and/ or other types of connection. Thus, the client devices 112A-N can communicate with remote servers (e.g., host servers, mail servers, and/or instant messaging servers, etc.) that provide access to user interfaces of the World Wide Web via a web browser or application, for example.

In one embodiment, the host system is able to replace typical data miners (e.g., any company and/or server that is configured to gather information such as, for example, Google or Yahoo servers that gather customer data for analytics). In one embodiment, the host system provides data miners with raw data either through push or pull operations. The raw data is scrubbed of all identifying user information. This raw data can be used by data miners for more directed ads.

Figure 2:
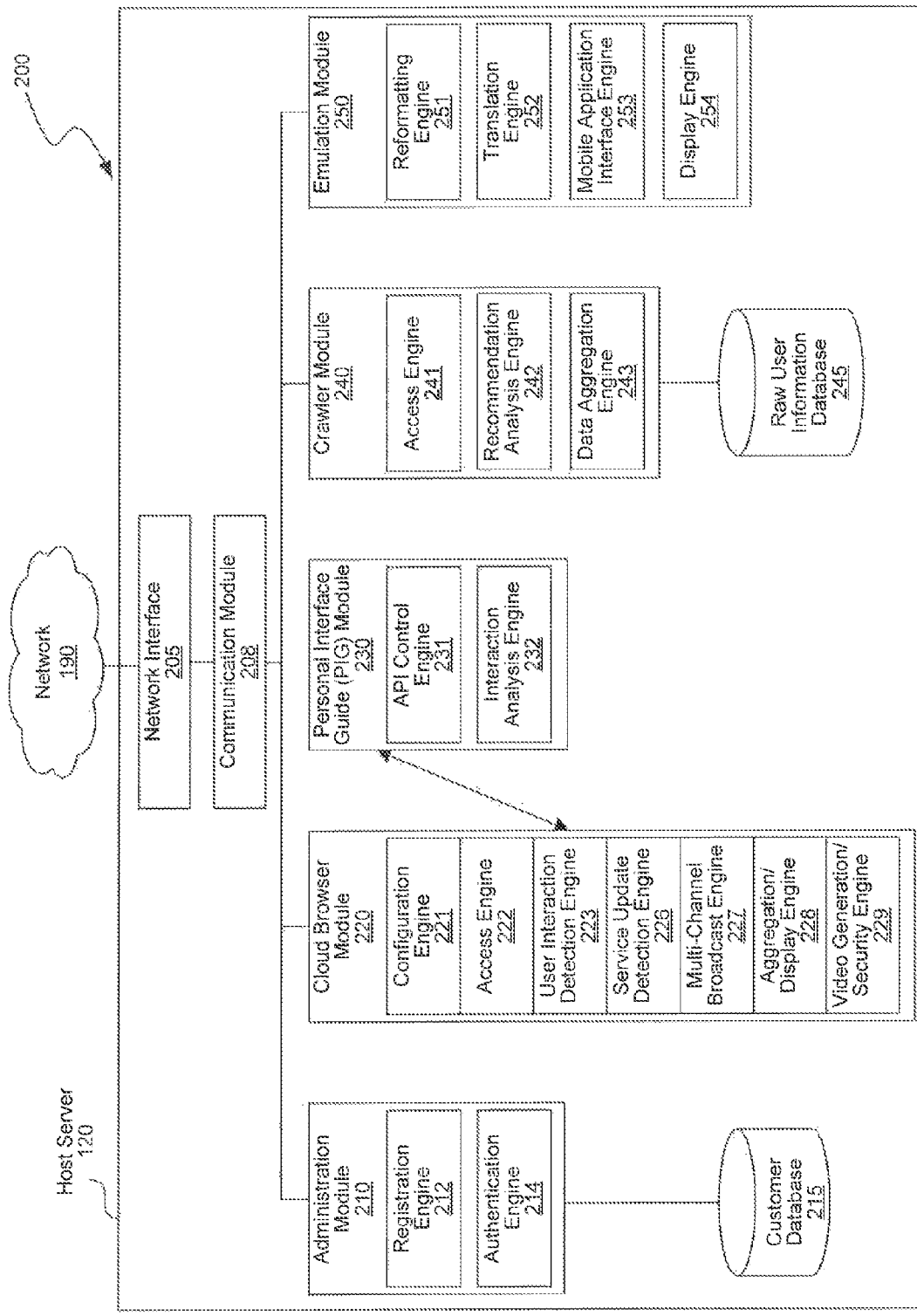
FIG. 2 depicts a block diagram illustrating example components of a host server for facilitating cloud-based web browsing.

FIG. 2 depicts a block diagram illustrating an example component of a system 200 that facilitates cloud-based web browsing with user presence management. The system 200 includes host server 120 coupled to a customer database 215 and raw user information database 245 containing aggregated/anonymous user information. As shown, the host server 120 is the host server of FIG. 1, although alternative configurations are possible.

The host server 120, although illustrated as comprised of distributed components (physically distributed and/or functionally distributed), could be implemented as a collective element. In some embodiments, some or all of the modules, and/or the functions represented by each of the modules can be combined in any convenient or known manner. Moreover, the functions represented by the modules can be implemented individually or in any combination thereof, partially or wholly, in hardware, software, or a combination of hardware and software.

In the example of FIG. 2, the host server 120 includes a network interface 205, a communication module 208, an administration module 210, a cloud browser module 220, a personal interface guide (PIG) module 230, a crawler module 240 and an emulation module 250. Additional or fewer modules can be included.

The host server 120 can be communicatively coupled to the customer database 215 and/or the raw user information database 245, as illustrated in FIG. 2. In some embodiments, the customer database 215 and/or the raw user information database are partially or wholly internal to the host server 120. In other embodiments, the customer database 215 and/or the raw user information database are coupled to the host server 120 over network 190 or another network.

In the example of FIG. 2, the network interface 205 can be one or more networking devices that enable the host server 120 to mediate data in a network with an entity that is external to the server, through any known and/or convenient communications protocol supported by the host and the external entity. The network interface 205 can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

In the example of FIG. 2, the host server 120 includes the communication module 208 communicatively coupled to the network interface 205 to manage a communication session over a plurality of communications protocols. In one embodiment, the communication module 208 receives data (e.g., audio data, textual data, audio files, etc.), information, commands, requests (e.g., text and/or audio-based), and/or text-based messages over a network. Since the communications module 208 is typically compatible with receiving and/or interpreting data originating from various communication protocols, the communications module 208 is able to establish parallel and/or serial communication sessions with remote client devices, third-party platforms, advertisers, and/or customers/subscribers.

One embodiment of the host server 120 includes an administration module 210. The administration module 210 can be any combination of software agents and/or hardware components able to manage and register users of host server 120. The administration module 210 includes a registration engine 212 and an authentication engine 214.

In one embodiment, the registration engine 212 is configured to register new users and/or customers/subscribers with the system and/or create new accounts with the host server 120. During registration the user can provide login credentials for the host system; however, the login credentials for third-party platforms (e.g., various social networking sites) are not stored. The authentication engine 214 is configured to authenticate the host users as they access the host server 120 from a variety of devices. In some embodiments, authentication occurs by associating a user's username and password with an existing user account. Unauthorized users can be directed to register with the system.

One embodiment of the host server 120 includes a cloud browser module 220. The cloud browser module 220 can be any combination of software agents and/or hardware components able to interact with users that have logged in and/or otherwise accessed the host server 120 via client devices. In one embodiment, the cloud browser module 220 facilitates the cloud-based web browsing for authenticated users (i.e., users logged in to the system).

The cloud browser module 220 can include a configuration engine 221, an access engine 222, a user interaction detection engine 223, a service update detection engine 226, a multi-channel broadcast engine 227, an aggregation/display engine 228 and a video generation/security engine 229. In some embodiments, the cloud browser module 220 interacts with an application downloaded onto a client device or mobile device. In other embodiments, the cloud browser module 220 interacts with a remote Internet browser (e.g., Microsoft Internet Explorer or Mozilla Firefox).

In some embodiments, the configuration engine 221 allows a user to configure all aspects of their cloud-based web browsing experience including, but not limited to, what channels to display in the dashboard, what notifications the user would like to receive when updates to channels occur, the type of data the user is willing to provide to service providers, when to notify the user about user data, etc.

In some embodiments, the access engine 222 accesses and/or otherwise interacts with third-party systems on behalf of a user. The user must, at least initially, log in to each service that is displayed in a tile of the dashboard and, based on the third-party system and user settings, these third-party systems often keep the users logged in for a preset period of time (e.g., two weeks) or indefinitely. The sessions for each tile for each third-party system are thus started by the user and essentially left open in the cloud for the user when the user logs in to their account with the host server (e.g., the system as referred to herein).

In some embodiments, the user interaction detection engine 223 detects user interactions with the dashboard (e.g., drag and drop from one tile or third-party system to another). The interaction detection engine 223 then works with a personal interface guide (PIG) to identify and make smart recommendations to the user about what he/she can do based on pre-existing application program interfaces (APIs) that correspond to the third-party systems. For example, if the user drags a video from Facebook to Flickr, the system will determine that the data item is a video file, access the API for Flickr and determine whether a video can be posted to the user's Flickr account. Because Flickr does not allow videos, the system will notify the user as such and, as discussed below, the PIG can make a recommendation to the user (e.g., post first frame of video as pic?).

In some embodiments, the service update detection engine 226 detects updates in the third-party service websites and can notify a user based on the user-configured preferences. For example, a user may be notified via audio sound or visually via a shaking tile. Other notifications are also possible.

In some embodiments, the multi-channel broadcast engine 227 is configured to broadcast a single post to various channels. Again, the PIG can suggest posts if, for example, a word limit is exceeded for an individual channel or the API does not provide for a particular type of the post.

In some embodiments, the aggregation/display engine 228 is configured to aggregate the various channels (e.g., websites).

In some embodiments, the video generation/security engine 229 is configured to generate a video feed for delivery to the user. The system delivers the emulated cloud browsing sessions (channels) and other configuration information to a user in the form of video which can be compressed, encrypted, etc. as is known in the art.

One embodiment of the host server 120 includes the PIG module 230. The PIG module 230 can be any combination of software agents and/or hardware components able to interface with the user interaction detection engine 223 to identify what actions can be performed responsive to detection of a user interaction (e.g., drag and drop) and to intelligently recommend potential modifications to a target data item.

The PIG module 230 can include an API control engine 231 and an interaction analysis engine 232.

In some embodiments, the API control engine 231 can access updates to API interfaces for selected third-party systems, store the APIs, and include smart algorithms that determine a variety of responses, for example, when a particular data item is not compatible with an API (e.g., video dragged but only image allowed).

In some embodiments, the interaction analysis engine 232 processes real-time user interactions and works with the API control engine 231 to recommend alternative actions and/or determine whether the interaction is compatible with the target API.

One embodiment of the host server 120 includes the crawler module 240. The crawler module 240 can be any combination of software agents and/or hardware components able to access third-party platforms on behalf of users in order to process the actions of users across each of these platforms and make intelligent advertisement recommendations based on the data obtained.

The crawler module 240 can include an access engine 241, a recommendation analysis engine 242, and a data aggregation engine 243. Additionally, the crawler module 240 can be in communication with a raw user information database 245 that can store the aggregated anonymous user information.

In some embodiments, the access engine 241 accesses third-party systems on behalf of the user.

In some embodiments, the recommendation analysis engine 242 makes relevant decisions about what the user is doing and what the user may want so that more relevant advertisements can be displayed to the user.

In some embodiments, the data aggregation engine 243 can aggregate data from various users and store this information in raw user information database 245. The information can then be used by data miners, etc. Advantageously, the raw data contains no user-identifiable information.

One embodiment of the host server 120 includes an emulation module 250. The emulation module 250 can be any combination of software agents and/or hardware components able to emulate, reformat, and/or translate Internet data (e.g., websites). For example, the emulation module 250 can provide subscribers with a 'white label' service whereby an application or website is automatically generated. The 'white label' service may be available to customers (e.g., small and/or medium businesses) as a paid service. Additionally, a filter may be provided as a service that allows customers to use the system to detect changes to competitors' websites. For example, a restaurant could have a dashboard configured with the websites of competitors and have a filter that detects and notifies them when, for example, a change is made to a menu at one of the competitor restaurants.

The emulation module 250 can include a reformatting engine 251, a translation engine 252, a mobile application interface engine 253, and a display engine 254.

In some embodiments, the reformatting engine 251 can reformat and/or reorganize a business's website. For example, a small business may have a slow HTML website that would not be accessible via a mobile device because it is incompatible or slow. The system can reformat the website and display it to a user.

In some embodiments, the translation engine 252 can translate a website's language automatically in real time, in anticipation of, or prior to use.

In some embodiments, the mobile application interface engine 253 interacts with the mobile applications to receive geolocation information, etc. that can be used to make recommendations to the users.

In some embodiments, the display engine 254 configures the information in the emulation module 250 for display to a customer (user). For example, the video generation engine may be accessed, etc.

The customer database 215 and raw user information database 245 can store various information such as software, descriptive data, images, system information, drivers, and/or any other data item utilized by parts of the host server 120. The customer database 215 and raw user information database 245 can be managed by a database management system (DBMS) such as, but not limited to, Oracle, DB2, Microsoft Access, Microsoft SQL Server, PostgreSQL, MySQL, FileMaker, etc.

The customer database 215 and raw user information database 245 can be implemented via object-oriented technology and/or via text files, and can be managed by a distributed database management system, an object-oriented database management system (OODBMS) (e.g., ConceptBase, FastDB Main Memory Database Management System, JDO-Instruments, ObjectDB, etc.), an object-relational database management system (ORDBMS) (e.g., Informix, OpenLink Virtuoso, VMDS, etc.), a file system, and/or any other convenient or known database management package. As shown, the customer database 215 and raw user information database 245 are coupled to host server 120. It is appreciated that, in some embodiments, the customer database 215 and raw user information database 245 may be alternatively or additionally directly coupled to network 190 and/or distributed across multiple systems.

In some embodiments, reformatting engine 251 and translation engine 252 have ability to translate and reformat HTML to HTML5.

In some embodiments, the emulation module 250 can also include IOS emulation engine 255, Android emulation engine 256, OSX emulation engine 257, Windows emulation engine 258, and Linux emulation engine 259.

Figure 3:
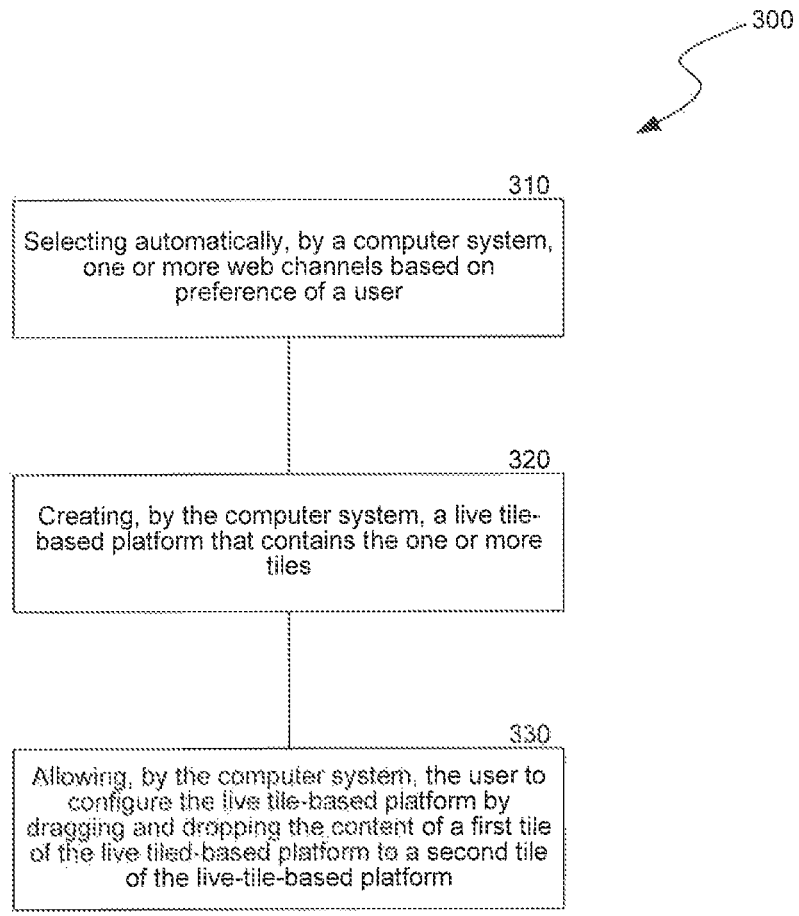
FIG. 3 illustrates a flow chart that describes an example of how the computer system can facilitate users to manage their full online presence.

FIG. 3 illustrates a flow chart that describes an example of method 300 computer system uses to facilitate users to manage their full online presence.

At step 310, a computer system can automatically select one or more web channels based on preference of a user. In one embodiment, a user may be more interested in viewing video, thus more interested in web channels such as YouTube. In one embodiment, a user may be more interested in interacting with friends on the social network, such as Facebook. The computer system can choose either YouTube or Facebook depending on the past activities of the user.

At step 320, the computer system can create a live tile-based platform that contains the one or more tiles. In one embodiment, each tile represents an individual web channel. For example, one tile can represent YouTube. Another tile can represent Facebook. In one embodiment, each tile automatically updates itself. For example, when someone in the user's friend list posts a picture on your Facebook wall, the tile that represents Facebook automatically gets updated in real time.

At step 330, the computer system, can allow the user to configure the live tile-based platform by dragging and dropping the content of a first tile of the live tiled-based platform to a second tile of the live-tile-based platform. For example, one tile can represent Twitter. Another tile can represent Facebook. A friend of the user posted an image on the wall of Facebook. Then the user has the option to drag the image and drop the image to the tile that represents Twitter. During the process, no source code of Facebook or Twitter get altered. The process of dragging and dropping happens smoothly.

Figure 4:
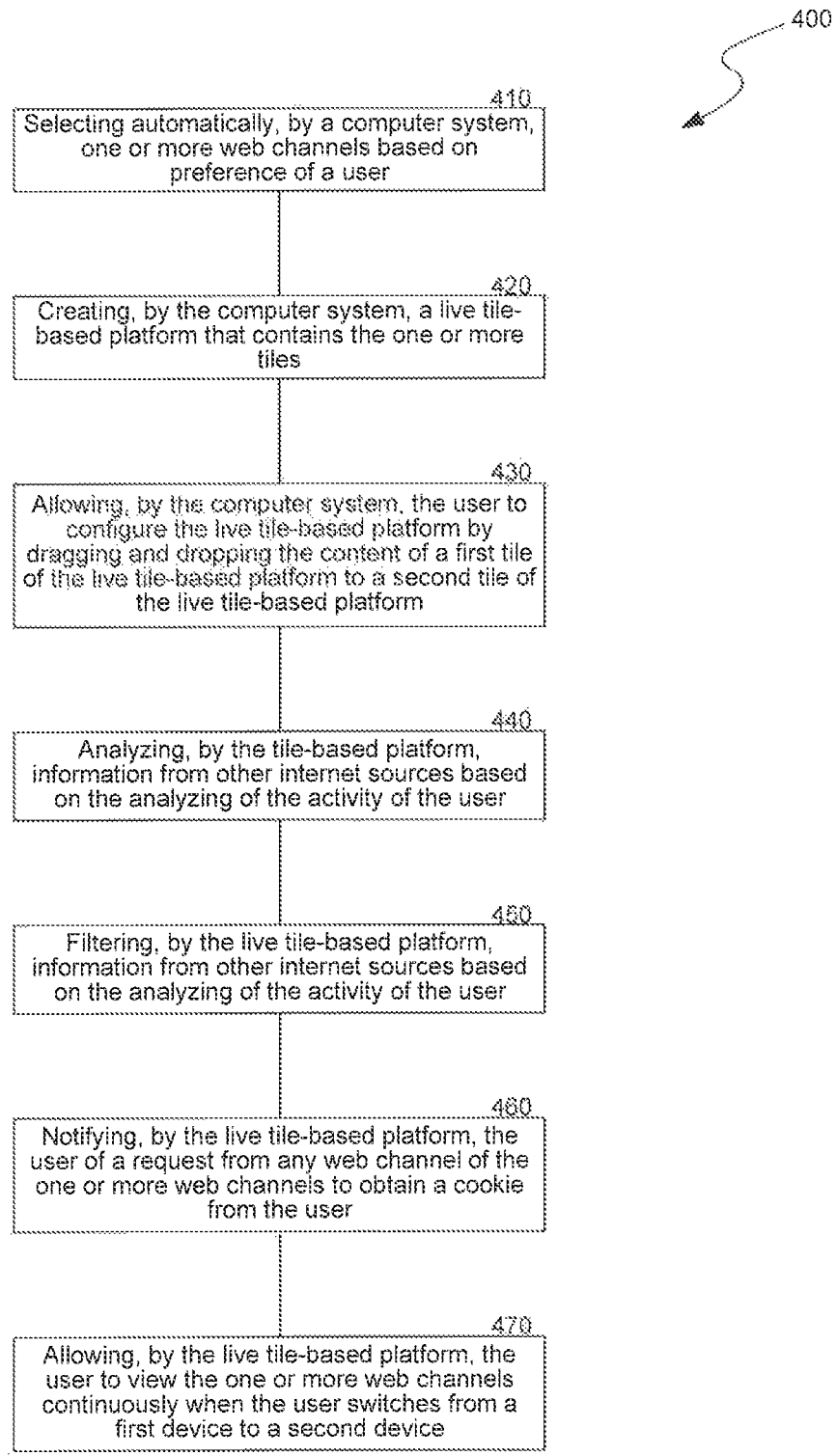
FIG. 4 illustrates a flow chart that describes another example of how the computer system can facilitate users to manage their full online presence.

FIG. 4 illustrates a flow chart that describes another example of method 400 computer system uses to facilitate users to manage their full online presence.

At step 410, a computer system can automatically select one or more web channels based on preference of a user. In one embodiment, a user may be more interested in viewing video, thus more interested in web channels such as YouTube. In one embodiment, a user may be more interested in interacting with friends on the social network, such as Facebook. The computer system can choose either YouTube or Facebook depending on the past activities of the user.

At step 420, the computer system, can create a live tile-based platform that contains the one or more tiles. In one embodiment, each tile represents an individual web channel. For example, one tile can represent YouTube. Another tile can represent Facebook. In one embodiment, each tile automatically updates itself. For example, when someone in your friend list posts a picture on your Facebook wall, the tile that represents Facebook automatically gets updated in real time.

At step 430, the computer system can allow the user to configure the live tile-based platform by dragging and dropping the content of a first tile of the live tiled-based platform to a second tile of the live-tile-based platform. For example, one tile can represent Twitter. Another tile can represent Facebook. A friend of the user posted an image on the wall of Facebook. Then the user has the option to drag the image and drop the image to the tile that represents Twitter. During the process, no source code of Facebook or Twitter get altered. The process of dragging and dropping happens smoothly.

At step 440, the tile-based platform can analyze information from other Internet sources based on the analyzing of the activity of the user. For example, if the platform learned that the user has searched for price of a Nissan car in the search engines, the platform can remember this and forward advertisement or information about Nissan cars to the user. The user would be more efficient in receiving relevant information and the advertisement would be more targeted.

At step 450, the live tile-based platform filters information from other Internet sources based on the analyzing of the activity of the user. For example, if the platform learned that the user plans to go out for a long trip, the platform would filtered out the advertisement for home improvement because the advertisement would be less efficient. The user can also reduce the number of useless advertisements forwarded to the user.

At step 460, the live tile-based platform can notify the user of a request from any web channel in the platform to obtain a cookie from the user. For example, when the user visited Facebook, Facebook may request a cookie from the user for fast access of the website. The user would get notified by the platform and would have the option to grant or deny the request.

At step 470, the live tile-based platform can allow the user to view the web channels continuously when the user switches from a first device to a second device. For example, a user can log in to her dashboard from her work computer, enlarge a tile displaying her Gmail account, and start an email to a friend. The user can then, without logging out of Gmail, log out of her dashboard and/or close down her work computer and then log back in to her dashboard with her mobile device to finish her email right where she left off.

Figure 5:
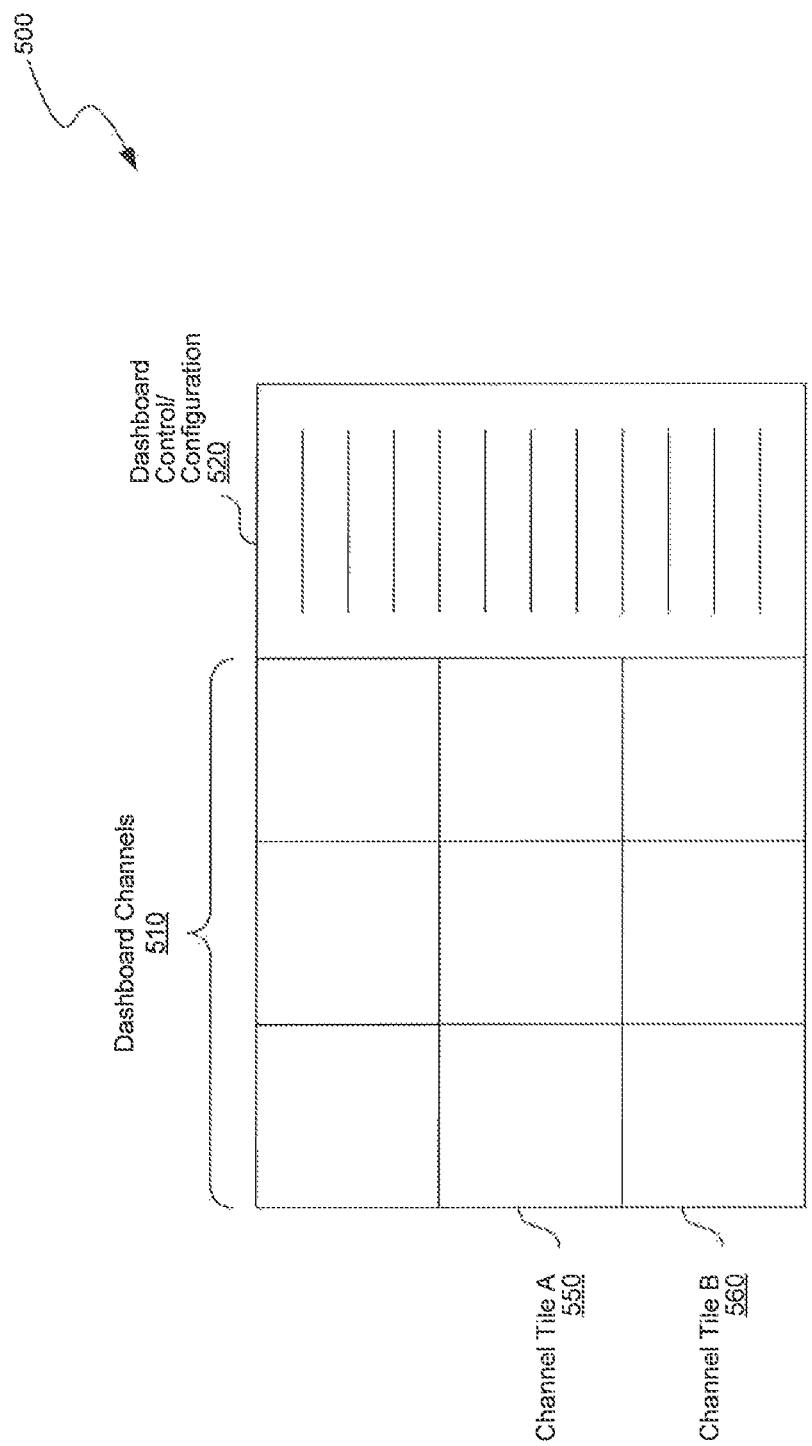
FIG. 5 depicts an example tile-based dashboard for cloud-based web browsing.

FIG. 5 depicts an example tile-based dashboard 500 illustrating numerous selected channels for cloud-based web browsing. Specifically, dashboard 500 illustrates an example screenshot showing numerous selected dashboard channels 510 and a dashboard control/configuration 520. In this example, the selected dashboard channels are shown in a grid. Each channel can represent a third-party service or website. For example, a first channel tile A is shown as 550. For example, channel tile A can be a LinkedIn Channel tile. In another embodiment, a second channel tile B 560 can be a Yahoo tile.

Each tile in the dashboard channels 510 is dynamically updated. In some embodiments, updates to particular channels can be indicated to a user. For example, if the LinkedIn Channel 550 is updated with a new post, then the tile (or pane), e.g., LinkedIn tile 550, can temporarily enlarge or shake slightly to get the users attention. Alternatively or additionally, sounds may be used as notification of updated content in one or more tiles.

In one embodiment, an item in Yahoo tile 560 can be dragged and dropped into LinkedIn Channel 550.

Additionally, the types of notification(s) for each tile can be configurable. For example, a user may only want to be notified about updates to certain channels. The user can configure different sounds and/or other visual notification (shaking, etc.) for each of these channels. The period for which the temporary notification lasts can also be configurable.

In one embodiment, the system creates a unique user experience, which is web-browser-based and no additional Browser-Plugins are needed. The system can connect multiple displays of websites in the World Wide Web. The Application views are web-based and not desktop-based, like SurfCast or Windows 8 is. The system displays a multi-view of web sites (e.g., dashboard), in one web browser window.

In one embodiment, the system can update and refresh the display-state of a website tile. Even contents from website A can be moved to view website B via drag-and-drop. Current systems such as, for example, SurfCast, cannot exchange data from Application A to Application B. However, the system described herein can exchange data from website A to website B. Additionally, the system has a black-list for child protection.

In one embodiment, the system can make text suggestions while moving text or a web-image from Web-Mail-Client view to social-media view. Posting a video on YouTube is easy with one click on the system: one Application, one choice, for everyone who has a web-browser.

In one embodiment, the system offers the user a filter for favorite web services on one perspective in many views. For example, the following aspects can be configured:
  Add or remove a service.
  Enable visual alerts for favorite sites, etc.
  The live-views, which can have a preconfigured refresh rate set at, for example, 5 seconds, are sent with JavaScript requests from the user's browser to the re2you web server.
  The view order can be arranged with mouse by drag and drop. (Client: JavaScript, AJAX).
  A zoomed perspective initiated by a double click performs the following: Drag & Drop can transfer texts, links, mail-attachments and images to a different perspective (Client: JavaScript, AJAX).

Furthermore, the system offers text-recognition and text auto-correct if the user wants to exchange data via Drag & Drop, i.e. from a perspective "WebMailClient" to the other perspective "SocialMedia", All of the user's link and text content can be checked via blacklist-on-demand to protect children.

Figure 6:
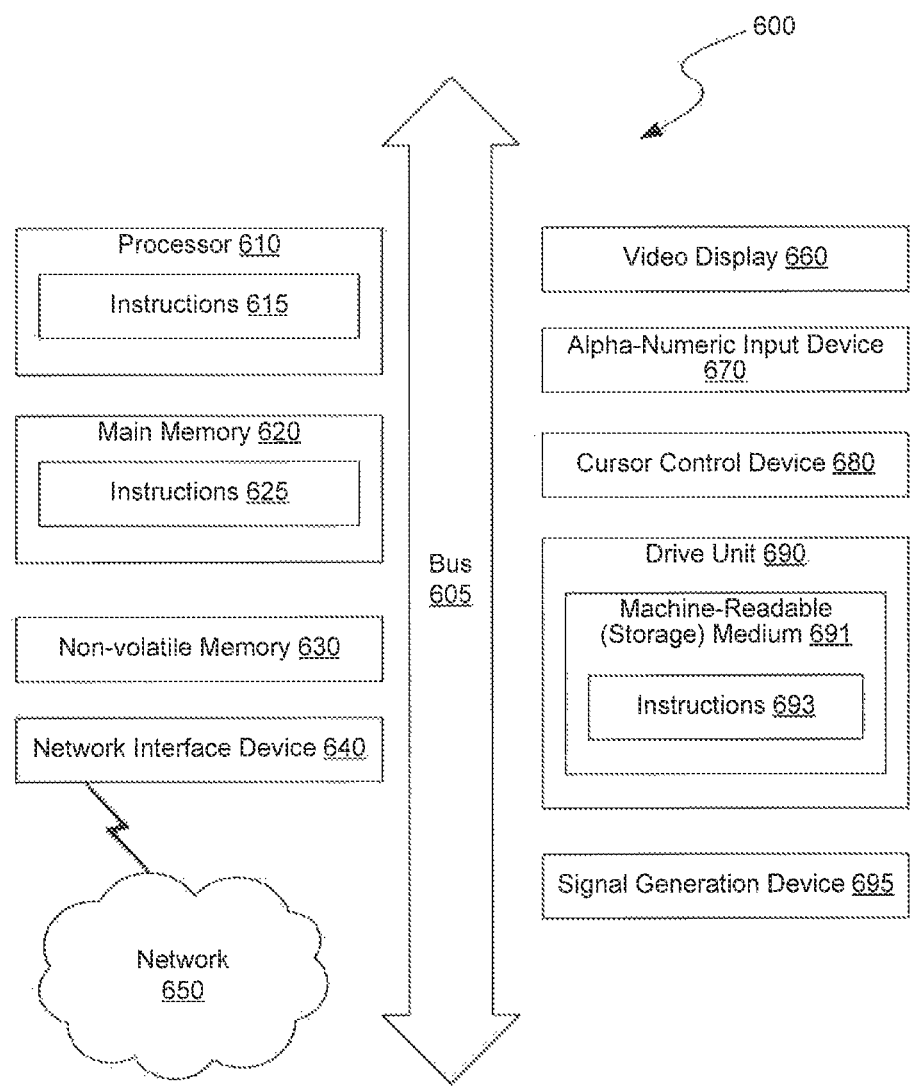
FIG. 6 depicts a diagrammatic representation of a machine in the example form of a computer system within which a set of instructions for causing the machine to perform any one or more of the methodologies discussed herein may be executed.

FIG. 6 shows a diagrammatic representation of a machine in the example form of a computer system 600, within which a set of instructions for causing the machine to perform any one or more of the methodologies discussed herein may be executed. The computer system 600 can include a processor 610. The processor 610 can have instructions 615 stored in the process 610. The computer system 610 can also include main memory 620 that may include instructions 625. The computer system 610 further can include non-volatile memory 630, network interface device 640, video display 660, alpha-Numeric Input device 670, drive unit 690 and Signal generation device 695. The network interface device 640 can interact with network 650. The drive unit 690 can include machine-readable medium 691 that can store Instructions 693. All the components are connected by bus 605.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (FDA), a cellular telephone or smart phone, a tablet computer, a personal computer, a web appliance, a point of sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (e.g., a centralized or distributed database, and/or associated caches and servers) that store the one or more sets of instructions. The term "machine-readable medium" or "machine-readable storage medium" shall also be taken to include any medium that is capable of storing, encoding or carrying a set of instructions for execution by the machine and that causes the machine to perform any one or more of the methodologies of the present invention.

In general, the routines executed to implement the embodiments of the disclosure may be implemented as part of an operating system or a specific application, component, program, object, module or sequence of instructions referred to as "computer programs." The computer programs are typically comprised of one or more set of instructions at various times in various memory and storage devices in a computer, and that, when read and executed by one or more processors in a computer, cause the computer to perform operations to execute elements involving the various aspects of the disclosure.

Moreover, while embodiments have been described in the context of fully-functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Figure 7:
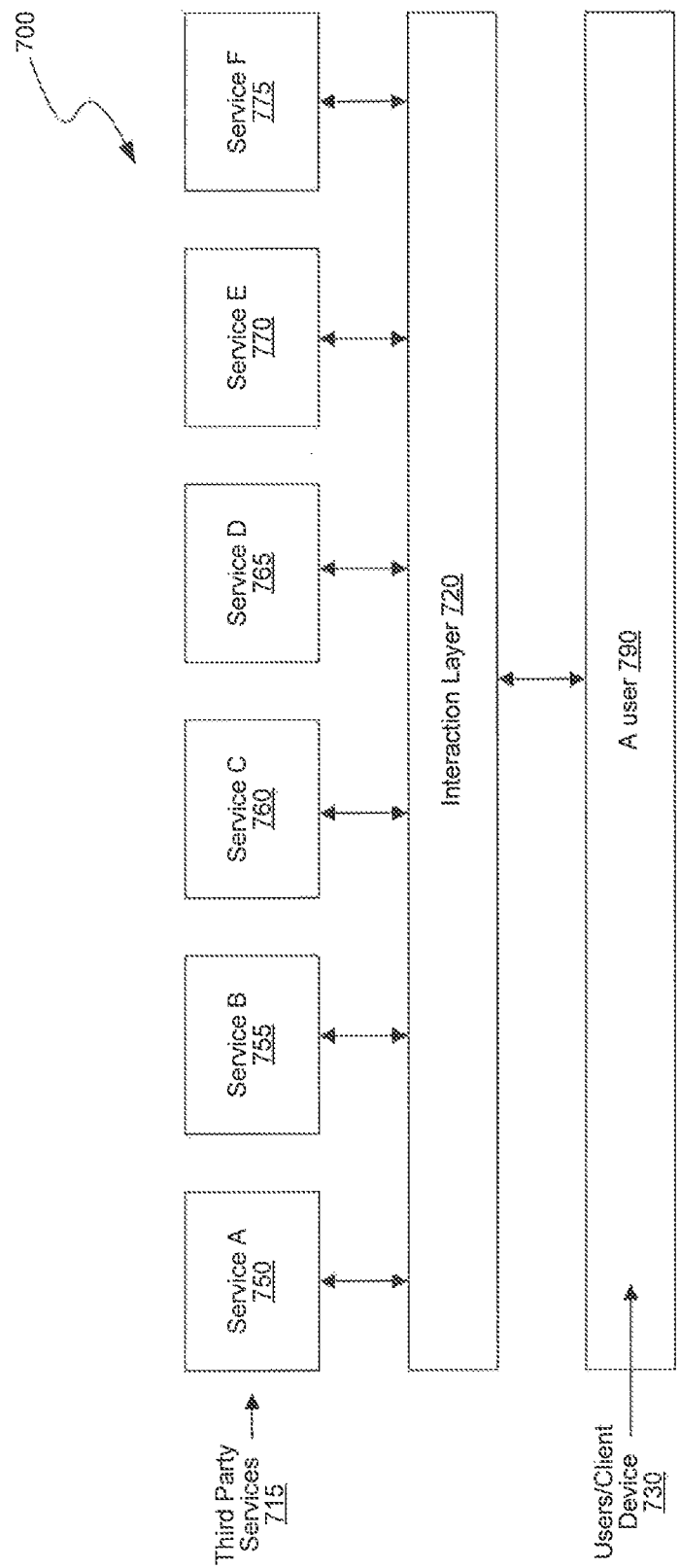
FIG. 7 depicts a block diagram illustrating an example conceptual interaction layer suitable for facilitating cloud-based web browsing.

FIG. 7 depicts a block diagram illustrating an example environment 700 including a conceptual interaction layer suitable for facilitating cloud-based web browsing with user presence management. The example environment 700 includes various third party services 715, the interaction layer 720, and a user/client device layer 730. The example environment can be the example environment 100 of FIG. 1; although alternative configurations are possible.

As illustrated in the example of FIG. 7, the system provides an intercloud layer that sits on top of the Internet that revolutionizes how information is used and created. For example, in some embodiments the system provides a cloud that connects the user's favorite web services (e.g., third party services 715) giving users easy cross-site interaction and access to relevant offerings. The system further protects the users' personal data, essentially acting as an integrated social identity management, marketing insight generation and payment platform. The third party services 715 can include Service A 750, Service B 755, Service C 760, Service D 765, Service E 770, Service F 775. The Third Party Services 715 Interacted with a user 790 and Users/Client Device 730 through an Interaction Layer 720.

The system binds the insular platforms (e.g., third-party services 715) that are currently found on the web into one layer and integrates a user's personal data on those platforms into a single, coherent profile of the user. The system achieves this virtualized single platform by acting as the interaction layer 720 between services. It enables the user to own his/her content and data again while allowing marketers to provide relevant offerings.

Advertisers (e.g., marketers of ecommerce sites, SMEs & micro-advertisers with established platforms) are ever more dependent on data driven companies such as Google or Facebook to access their customers while the return on their advertisements is still very low. That's because they only know their own part of the puzzle and don't access the full experience of a user. SMEs and ecommerce sites looking for an alternative and are potential customers. Thus, the system described herein helps user (re)own their web experience and allows users to maintain their privacy while still enabling marketers to make relevant offerings.

The system connects multiple websites and apps into one tile-based interface. Users get views of their favorite sites, which are shown in a single browser tab or a single app for User/Client Device 730. By changing the order and size of the views and adding new services, a user will be able to create a personal web experience.

The system described herein is not just a dashboard or simple startpage. It connects the various sites with each other, creating an immersive web experience. As discussed, a user can drag and drop content (links, text, images, videos, sound, attachments) from one site into another. By dragging cloud-hosted data into a site, the user will never have to up- or download content (data items) that is already hosted by at least one third-party provider again. The user is also also able to zoom into single sites to create content with full text recognition, auto correct, etc. Additional features are also possible. Updates and social interaction on the sites can be indicated by visual alerts. The data and communication is fully encrypted on the cloud, including any payments. All of these features are provided by the system without plugins and in a real-time (live) manner.

The users manage their own presence. That is, the user's experiences belong to that user and by keeping personal data and preferences within the system (intercloud layer), the user will no longer be profiled by ecommerce sites and businesses. Instead, the user's personal intercloud layer (provided by the system described herein) will transfer marketing insight to these ecommerce sites and businesses. Currently, marketers receive information about people's shopping behavior and interests on a single site but have to make sense of this information without a larger context. By looking at the whole web activity across multiple platforms (third-party platforms), the system is able to determine what it is actually need.

The system doesn't transmit or share the user's data. Rather, only insights are transmitted based on what the user needs so that the ecommerce sites can provide more relevant offerings (e.g., advertisements). This simplifies the users lives as they will no longer be harassed with targeted ads on "more of the same" of whatever the latest purchase was, or the latest search. At the same time, it will make life easier for marketers as they won't have to spam or profile users. Thus, the system gives the power of the Internet to the user. The user decides how to experience the web and how to own their content and data. Additionally, the system provides transparency as the user will be able to view their own data and the insights generated based on this data to get a better understanding of their web experience.

Additionally, by enabling the users to specify sites and content to block for child protection, the system also prevents the display of inappropriate offers. The user decides what they want to see.

For example, you are going on a hiking vacation with four of your friends. You have bought your tickets on Expedia.com, you have found a place to stay on Airbnb and created your hiking route with Google maps. You have been sending messages to each other on Facebook about it and have been following other hikers on Twitter. You even bought your backpack on Amazon.

Now, you took a picture of your backpack, but you will have to upload it to both Facebook and Twitter. You will have to download and upload it again on the hiking forum you went to ask for advice on further equipment. You will have to do this since Amazon keeps offering you more backpacks. Google will start offering you car rentals since you purchased your flight tickets via your google mail account.

Amazon doesn't know why you bought a backpack. Google doesn't know that you don't need a car and Facebook doesn't know that you are already connected to fellow hikers on Twitter and will keep showing you "relevant" groups. All the while, these companies will keep collecting data about you, creating more profiles and creating a privacy risk to you while not enabling you to own your data or your content.

With the system described herein you will be able to just swipe and connect these platforms to create an easy flow and build your own web experience. You will drag your backpack picture from Amazon to Twitter, Facebook or the hikers forum. You will be able to keep track of all conversations in one spot, instead of changing from tab to tab or from app to app. You will also no longer get irrelevant ads since advertisers will know why something is being bought.

Instead of getting an ad for another backpack or for an arctic sleeping bag, Amazon will show you a tarp because the system knows (e.g., determines) that you will be hiking in a hot climate. For the same reason, Google will offer you an ad for bike rentals since you won't need a car.

All the while, none of these companies will feed their data engine since the system will make a specific search for offerings in your stead. Unless, of course, you don't want the system to make the search. Also, you will be able to track your own web use and what it means on the system. For example, you'll know what kinds of content and data you have in your own cloud.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

I claim:

1. A computer-implemented method, comprising:
    selecting automatically, by a computer system, multiple web channels based on one or more preferences of a user;
    creating, by the computer system, a live tile-based platform including the multiple tiles, wherein at least one tile of the multiple tiles displays content of at least one web channel of the multiple web channels, wherein the user gains access to the content of the web channels via a single authentication with the live tile-based platform, and wherein the one or more tiles are updated in real-time;
    allowing, by the computer system, the user to configure the live tile-based platform by dragging and dropping the content of a first tile of the live tile-based platform to a second tile of the live tile-based platform, wherein the configuration of the live tile-based platform is independent from the one or more web channels;
    analyzing a first user interaction associated with the first tile and the second tile; and
    recommending a second user interaction based on properties associated with a first web channel of the web channels presented in the first tile and a second web channel of the web channels presented in the second tile,
    wherein the content of the first tile is a video and the properties of the second web channel indicate that the second web channel does not support video files but supports an image file, and
    wherein recommending the second user interaction includes recommending that the user store the video as the image file in the second web channel, and selecting one of multiple frames of the video as the image file prior to transferring the content to the second web channel.

2. The computer-implemented method of claim 1, wherein the one or more preferences of the user are determined, at least in part, based on past browsing history of the user in the live tile-based platform.

3. The computer-implemented method of claim 1, wherein selecting one of the multiple frames includes selecting a first frame of the multiple frames of the image file.

4. The computer-implemented method of claim 1 further comprising:
    receiving updated data in the first web channel of the multiple web channels presented in the first tile; and
    notifying the user by visually shaking the first tile.

5. The computer-implemented method of claim 1 further comprising:
    broadcasting a single post by the user at a first web channel of the web channels presented in the first tile to at least some of the remaining web channels presented in at least some of the remaining tiles.

6. The computer-implemented method of claim 1, wherein the tiles are arranged into multiple rows and multiple columns in the live tile-based platform.

7. A system comprising:
    one or more processors;
    a computer readable storage medium having instructions stored thereon which, when executed by the one or more processors, cause the system to:
        select multiple web channels based on one or more preferences of a user;
        create a live tile-based platform including the multiple tiles, wherein at least one tile of the multiple tiles displays content of at least one web channel of the multiple web channels, the user gains access to the content of the web channels via a single with the live tile-based platform, and wherein the one or more tiles are updated in real-time;
        provide an interface through which the user can configure the live tile-based platform by dragging and dropping the content of a first tile of the live tile-based platform to a second tile of the live tile-based platform, wherein the configuration of the live tile-based platform is independent from the one or more web channels;
        analyze a first user interaction associated with the first tile and the second tile; and
        recommend a second user interaction based on properties associated with a first web channel of the web channels presented in the first tile and a second web channel of the web channels presented in the second tile,
        wherein the content of the first tile is a video and the properties of the second web channel indicate that the second web channel does not support video files but supports an image file, and
        wherein recommending the second user interaction includes recommending that the user store the video as the image file in the second web channel, and selecting one of multiple frames of the video as the image file prior to transferring the content to the second web channel.

8. The system of claim 7, wherein the one or more preferences of the user are determined, at least in part, based on past browsing history of the user in the live tile-based platform.

9. The system of claim 7, wherein selecting one of the multiple frames includes selecting a first frame of the multiple frames of the image file.

10. The system of claim 7, wherein the instructions, when executed by the one or more processors, further cause the system to:
receive updated data in the first web channel of the multiple web channels presented in the first tile; and
notify the user by visually shaking the first tile.

11. The system of claim 7, wherein the instructions, when executed by the one or more processors, further cause the system to:
broadcast a single post by the user at a first web channel of the web channels presented in the first tile to at least some of the remaining web channels presented in at least some of the remaining tiles.

12. The system of claim 7, wherein the tiles are arranged into multiple rows and multiple columns in the live tile-based platform.

13. A non-transitory computer-readable storage medium having instructions stored thereon which, when executed by one or more processors of a computer system, cause the one or more processors to:
select multiple web channels based on one or more preferences of a user;
create a live tile-based platform including the multiple tiles, wherein at least one tile of the multiple tiles displays content of at least one web channel of the multiple web channels, the user gains access to the content of the web channels via a single with the live tile-based platform, and wherein the one or more tiles are updated in real-time;
provide an interface through which the user can configure the live tile-based platform by dragging and dropping the content of a first tile of the live tile-based platform to a second tile of the live tile-based platform, wherein the configuration of the live tile-based platform is independent from the one or more web channels;
analyze a first user interaction associated with the first tile and the second tile; and
recommend a second user interaction based on properties associated with a first web channel of the web channels presented in the first tile and a second web channel of the web channels presented in the second tile,
wherein the content of the first tile is a video and the properties of the second web channel indicate that the second web channel does not support video files but supports an image file, and
wherein recommending the second user interaction includes recommending that the user store the video as the image file in the second web channel, and selecting one of multiple frames of the video as the image file prior to transferring the content to the second web channel.

14. The computer-readable storage medium of claim 13, wherein the one or more preferences of the user are determined, at least in part, based on past browsing history of the user in the live tile-based platform.

15. The computer-readable storage medium of claim 13, wherein selecting one of the multiple frames includes selecting a first frame of the multiple frames of the image file.

16. The computer-readable storage medium of claim 13, wherein the instructions, when executed by the one or more processors, further cause the one or more processors to:
receive updated data in the first web channel of the multiple web channels presented in the first tile; and
notify the user by visually shaking the first tile.

17. The computer-readable storage medium of claim 13, wherein the instructions, when executed by the one or more processors, further cause the one or more processors to:
broadcast a single post by the user at a first web channel of the web channels presented in the first tile to at least some of the remaining web channels presented in at least some of the remaining tiles.

18. The computer-readable storage medium of claim 13, wherein the tiles are arranged into multiple rows and multiple columns in the live tile-based platform.

* * * * *